(12) United States Patent
Hishida et al.

(10) Patent No.: US 11,807,122 B2
(45) Date of Patent: Nov. 7, 2023

(54) CAPACITY CONTROL DEVICE AND COMPUTER-READABLE MEDIUM

(71) Applicant: HONDA MOTOR CO., LTD., Tokyo (JP)

(72) Inventors: Motoki Hishida, Saitama (JP); Hakaru Sadano, Saitama (JP); Hiroyuki Kanazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 253 days.

(21) Appl. No.: 17/368,863

(22) Filed: Jul. 7, 2021

(65) Prior Publication Data

US 2021/0331599 A1 Oct. 28, 2021

Related U.S. Application Data

(63) Continuation of application No. PCT/JP2019/001205, filed on Jan. 17, 2019.

(51) Int. Cl.
*B60L 53/62* (2019.01)
*B60L 55/00* (2019.01)
*B60L 50/60* (2019.01)
*B60L 58/12* (2019.01)

(52) U.S. Cl.
CPC ............... *B60L 53/62* (2019.02); *B60L 50/60* (2019.02); *B60L 55/00* (2019.02); *B60L 58/12* (2019.02)

(58) Field of Classification Search
CPC .......... B60L 53/62; B60L 55/00; B60L 50/60; B60L 58/12
See application file for complete search history.

(56) References Cited

U.S. PATENT DOCUMENTS

| | | |
|---|---|---|
| 2005/0156571 A1 | 7/2005 | Inui |
| 2015/0021991 A1 | 1/2015 | Wood |
| 2019/0111805 A1 | 4/2019 | Hidaka |

FOREIGN PATENT DOCUMENTS

| | | |
|---|---|---|
| CN | 1638228 A | 7/2005 |
| JP | 2008141926 A | 6/2008 |
| JP | 5002780 B2 | 8/2012 |
| JP | 2015082273 A | 4/2015 |

(Continued)

OTHER PUBLICATIONS

International Preliminary Report on Patentability for International Application No. PCT/JP2019/001205, issued by the International Bureau of WIPO dated Jun. 16, 2021.

(Continued)

*Primary Examiner* — Robert L Deberadinis

(57) ABSTRACT

A capacity control device including: a storage unit for storing information representing a first energy amount and a second energy amount of an amount of energy accumulated in a power source for driving mounted on a vehicle, the first energy amount being available for power transmission and reception between the power source for driving and a power grid without an instruction from a user of the vehicle, and the second energy amount being available to the user in response to an instruction from the user; a updating unit for updating the second energy amount without updating the first energy amount, and updating the first energy amount without updating the second energy amount; and a control unit for presenting information representing the second energy amount that has been updated by the updating unit to the user.

20 Claims, 11 Drawing Sheets

(56) References Cited

FOREIGN PATENT DOCUMENTS

| | | |
|---|---|---|
| JP | 2015514390 A | 5/2015 |
| JP | 6183576 B1 | 8/2017 |
| WO | 2017170741 A1 | 10/2017 |

OTHER PUBLICATIONS

Office Action issued for counterpart Chinese Application 201980086530.3, issued by The State Intellectual Property Office of People's Republic of China dated Jul. 25, 2023.

| VEHICLE ID | USER ID | TOTAL CAPACITY | AVAILABLE CAPACITY | SET CAPACITY FOR V2G | REMAINING CAPACITY FOR V2G | REMAINING CAPACITY FOR USER |
|---|---|---|---|---|---|---|
| V5000 | U1000 | 60kWh | 90% | 20% | 50% | 60% |
| V5001 | U1001 | 40kWh | 90% | 40% | 10% | 70% |
| ... | ... | | | ... | ... | ... |

CAPACITY CONTROL DEVICE AND COMPUTER-READABLE MEDIUM

CROSS REFERENCE TO RELATED APPLICATION

The contents of the following international application are incorporated herein by reference,
International Application NO. PCT/JP2019/001205 filed on Jan. 17, 2019.

BACKGROUND

1. Technical Field

The present invention relates to a capacity control device and a computer-readable medium.

2. Related Art

A technique for a storage battery management company to freely supply power from an on-vehicle storage battery to a power system within a range of a remaining capacity that is obtained from dividing a rated discharge capacity of the on-vehicle storage battery by a daily necessary storage amount is known (for example, refer to Patent Document 1 listed below).

PRIOR ART DOCUMENTS

Patent Documents

[Patent Document 1] Japanese Patent No. 5002780
[Patent Document 2] Japanese Patent No. 6183576
[Patent Document 3] Japanese Translation of PCT International Application Publication No. JP-T-2015-514390

BRIEF DESCRIPTION OF THE DRAWINGS

FIG. 4 illustrates one example of capacity information of a battery 32 in a table.

DESCRIPTION OF EXEMPLARY EMBODIMENTS

Hereinafter, the present invention will be described through embodiments of the invention. However, the following embodiments do not limit the invention defined in the claims. Some combinations of features described in the embodiments may be unnecessary for solving means of the invention. Throughout the drawings, the same or similar parts may be given the same reference number to omit duplicate descriptions.

Figure 1:
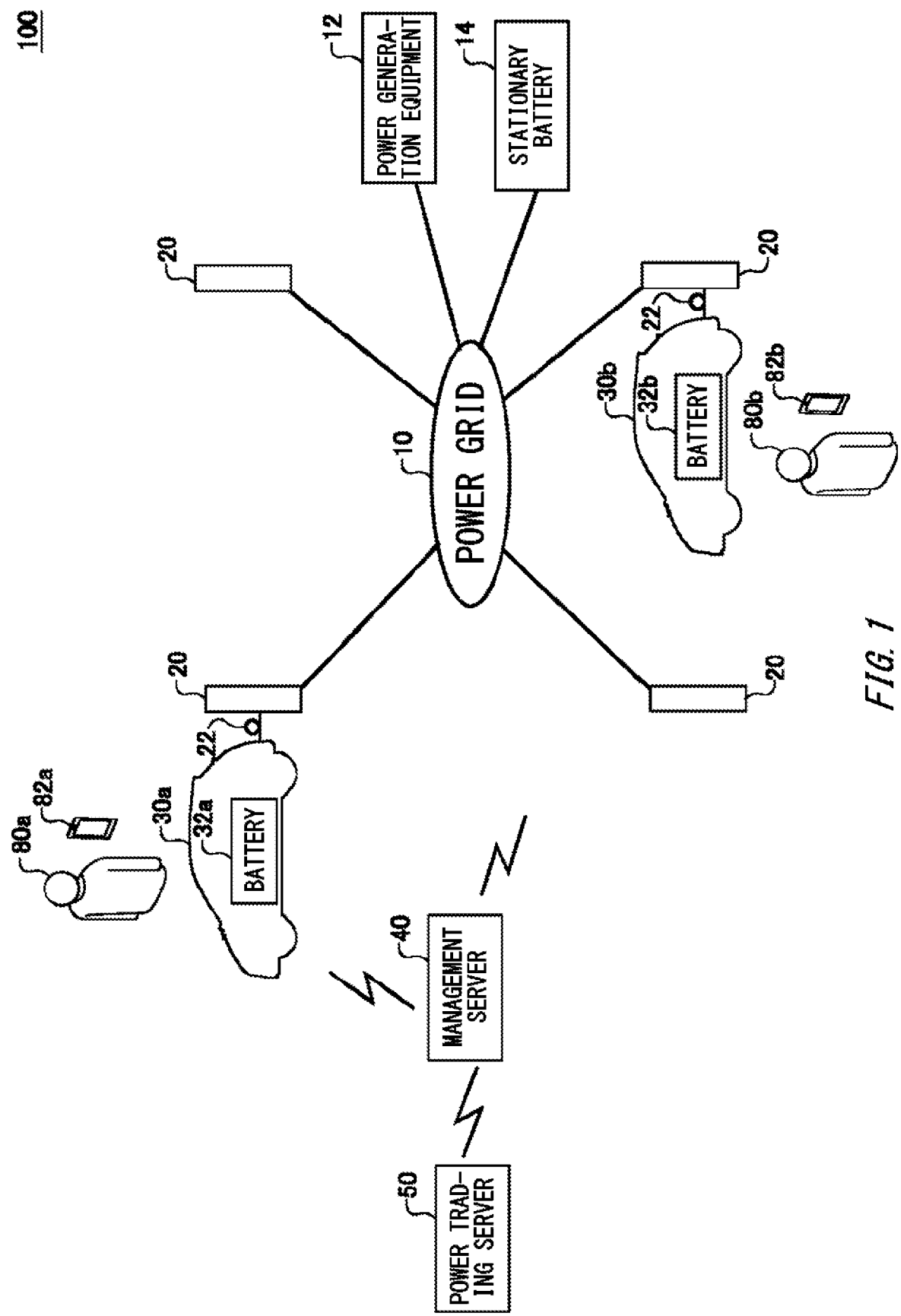
FIG. 1 schematically illustrates a basic configuration of a power transmission and reception system 100.

FIG. 1 schematically illustrates a basic configuration of a power transmission and reception system 100. The power transmission and reception system 100 is for performing V2G (Vehicle-to-Grid) in which a power aggregator interchanges power between a vehicle and a power grid by means of a battery mounted on the vehicle, for example. In order to manage a capacity of the battery of the vehicle, the power transmission and reception system 100 divides the capacity into a capacity for a user and a capacity for a power aggregator. In the present embodiment, performing at least one of releasing power from the vehicle to the power grid, and receiving power at the vehicle from the power grid is referred to as V2G.

The power transmission and reception system 100 includes a plurality of vehicles including a vehicle 30a and a vehicle 30b, a stationary battery 14, a plurality of charging and discharging facilities 20, a management server 40, power generation equipment 12, and a plurality of user terminals including a user terminal 82a and a user terminal 82b.

The user 80a is a user of the vehicle 30a. The user 80b is a user of the vehicle 30b. Note that, a user of the vehicle may be anyone to use the vehicle such as an owner of the vehicle or a family member of the owner. The vehicle 30a includes a battery 32a. The vehicle 30b includes a battery 32b. The user terminal 82a is a communication terminal used by the user 80a. The user terminal 82b is a communication terminal used by the user 80b.

In the present embodiment, a plurality of vehicles including the vehicle 30a and the vehicle 30b may be collectively referred to as "a vehicle 30". Also, a plurality of batteries including the battery 32a and the battery 32b may be collectively referred to as "a battery 32".

Note that, the battery 32 is one example of a power source for driving that is mounted on the vehicle 30. The power source for driving includes a power source that consumes fuel in order to generate electric energy to be provided to a power source of the vehicle 30, such as a fuel-cell. The fuel may be hydrogen, alcohol fuel, hydrocarbon fuel such as gasoline, light oil, and natural gas, or the like. The power source for driving may be any power source that can generate electric energy to be provided to the power source of the vehicle 30.

The vehicle 30 is one example of transport equipment. The vehicle 30 is a vehicle equipped with a power source that is driven by means of electric energy, such as an electric vehicle or a fuel-cell vehicle (FCV). The electric vehicle includes a battery electric vehicle (BEV), and a hybrid vehicle or a plug-in hybrid electric vehicle (PHEV) equipped with an internal-combustion engine that provides at least a part of driving power. In the present embodiment, the vehicle 30 is an electric vehicle equipped with the battery 32 as a power source for driving. In a configuration having the battery as the power source for driving, discharging the battery corresponds to releasing energy from the power source for driving, and charging the battery corresponds to accumulating energy into the power source for driving. Also, a remaining capacity of the battery corresponds to an amount of energy accumulated in the power source for driving such as an amount of power or an amount of electricity, which can be supplied from the power source for driving.

In the present embodiment, the user 80a and the user 80b may be collectively referred to as "a user 80". A plurality of user terminals including the user terminal 82a and the user terminal 82b may be collectively referred to as "a user terminal 82".

The user terminal 82 may be, for example, a mobile terminal, a personal computer, or a vehicle navigation device. An example of the mobile terminal can include a mobile phone, a smartphone, a PDA, a tablet, a notebook computer, a laptop computer, a wearable computer, and the like.

The management server 40 can communicate with the vehicle 30, the stationary battery 14, and the user terminal 82 through a communication network. The management server 40 can also communicate with a power trading server 50 through a communication network. The communication network may include a transmission channel for a wired communication or a wireless communication. The communication network may include a communication system such as the Internet, a P2P network, a dedicated line, a VPN, a power line communication line, and a mobile phone line.

The power grid 10 may include a power transmission system or a power distribution system in a power system, and a distribution network of a power grid. The power grid 10 may be provided in each region. The power grid 10 may be a micro-grid. The power grid 10 may be any scale of distribution network that connects a power source and power equipment by which power is consumed. For example, the power grid 10 may be a distribution network provided to any facility such as a commercial facility. The power grid 10 may be provided to each building. The vehicle 30, the stationary battery 14, a charging and discharging facility 20, and the power generation equipment 12 are connected to the power grid 10. The charging and discharging facility 20, the stationary battery 14, and the power generation equipment 12 can perform power transmission and reception with the power grid 10.

The power generation equipment 12 is managed by a power company or the like. The charging and discharging facility 20 includes, for example, a charging and discharging device installed in a house, or a charging and discharging stand installed in a car park or a public space of a residential complex, a building, or a store. The charging and discharging facility 20 is one example of an electric facility for accumulating energy in the power source for driving mounted on the vehicle 30.

The vehicle 30 is connected to the charging and discharging facility 20 through a charging and discharging cable 22. That is, the vehicle 30 is connected to the power grid 10 through the charging and discharging cable 22 and the charging and discharging facility 20. The vehicle 30 performs power transmission and reception between the battery 32 and the power grid 10 through the charging and discharging facility 20. For example, the vehicle 30 releases power obtained from discharging the battery 32 to the power grid 10 through the charging and discharging cable 22 and the charging and discharging facility 20. Also, the vehicle 30 charges the battery 32 with power supplied from the power grid 10 through the charging and discharging cable 22 and the charging and discharging facility 20. Note that, power transmission and reception to and from the power grid 10 may be referred to as "power transmission and reception with the power grid 10" or the like.

The stationary battery 14 is managed by the power aggregator. The battery 32 of the vehicle 30 forms a virtual power plant with the stationary battery 14. The management server 40 is managed by the power aggregator. The management server 40 controls power transmission and reception between the battery 32 and the power grid 10, and between the stationary battery 14 and the power grid 10.

The management server 40 performs power trading by bidding in a wholesale power market. The power trading server 50 is managed by an operator of the wholesale power market. The management server 40 bids with a time unit of 30-minute as one time frame to the power trading server 50. The management server 40 causes the battery 32 and the stationary battery 14 to discharge in each time frame based on a contract result in order to supply power to the power grid 10.

For example, the management server 40 causes the battery 32 and the stationary battery 14 to discharge according to a contract quantity bid by the power aggregator in the wholesale power market, and supplies the power grid 10 with power released from the battery 32 and the stationary battery 14. The management server 40 controls charge and discharge of the battery 32 and charge and discharge of the stationary battery 14 within a range of adjusting capability contracted in the bid made by the power aggregator in a demand and supply balancing market, thereby adjusts the power supply and demand in the power grid 10. For example, the management server 40 controls charge and discharge of the battery 32 and charge and discharge of the stationary battery 14 in response to an up demand response (up DR), a down demand response (down DR), or an up and down demand response (up and down DR) received from power transmission and distribution operators and retail electricity suppliers.

Specifically, the management server 40 controls at least one of the vehicle 30 and the charging and discharging facility 20 in response to the up DR in order to charge the battery 32 of the vehicle 30 with power received from the power grid 10 through the charging and discharging facility 20. Also, the management server 40 controls at least one of the vehicle 30 and the charging and discharging facility 20 in response to the down DR in order to discharge the battery 32 of the vehicle 30 and release power obtained from the discharge of the battery 32 to the power grid 10 through the charging and discharging facility 20.

In the present embodiment, the management server 40 manages a total capacity of each battery 32 of the vehicle 30 by dividing the total capacity into "a set capacity for the user" and "a set capacity for V2G". The management server 40 manages a remaining capacity of the battery 32 by dividing the remaining capacity into a remaining capacity for the user, which falls within a range of the set capacity for the user, and a remaining capacity for V2G, which falls within a range of the set capacity for V2G. The management server 40 reflects an amount of charge and discharge of the battery 32 performed in accordance with an instruction from the user 80 to the remaining capacity for the user, and presents this amount to the user 80. Meanwhile, the amount of charge and discharge is not reflected to the remaining capacity for V2G. The management server 40 reflects an amount of charge and discharge of the battery 32 performed in accordance with an instruction from the management server 40 to the remaining capacity for V2G. Meanwhile, the amount of charge and discharge is not reflected to the remaining capacity for the user.

By virtue of the management server 40, a remaining capacity to be presented to the user 80 remains unchanged even when the management server 40 freely charges or discharges the battery 32 within a limit of the remaining capacity for V2G. The remaining capacity to be presented to the user 80 is updated based on an amount of charge and discharge of the battery 32 performed in accordance with an instruction from the user 80. As a result, the user 80 can be provided with remaining capacity information that matches a sense of usage felt by the user 80. In addition, the management server 40 can systematically charge or discharge the battery 32 within the limit of the remaining capacity for V2G without substantially being affected by charge or discharge performed by the user 80.

In the present embodiment, power transmission and reception means at least one of the vehicle 30 and the power grid 10 transmits power that is received by the other. For example, power transmission and reception may mean releasing power from the vehicle 30 towards the power grid 10. Also, power transmission and reception may mean transmitting power from the power grid 10 towards the vehicle 30. When the vehicle 30 releases power through a charging and discharging device installed in a home or the like of a power consumer, and if the power consumer consumes power larger than the power released from the vehicle 30, then the power grid 10 may be supplied with no net power from a connection point between the power consumer and the power grid 10. In this case, an amount of power to be supplied to the power consumer from the connection point may simply be reduced. Even so, when seen from the power grid 10, it can be considered that the transmitted power has been received outside of the power grid 10. Therefore, in the present embodiment, when the vehicle 30 releases power in power transmission and reception with the power grid 10, it does not matter whether or not the power grid 10 receives net power from a particular connection point between the power grid 10 and the vehicle 30.

Figure 2:
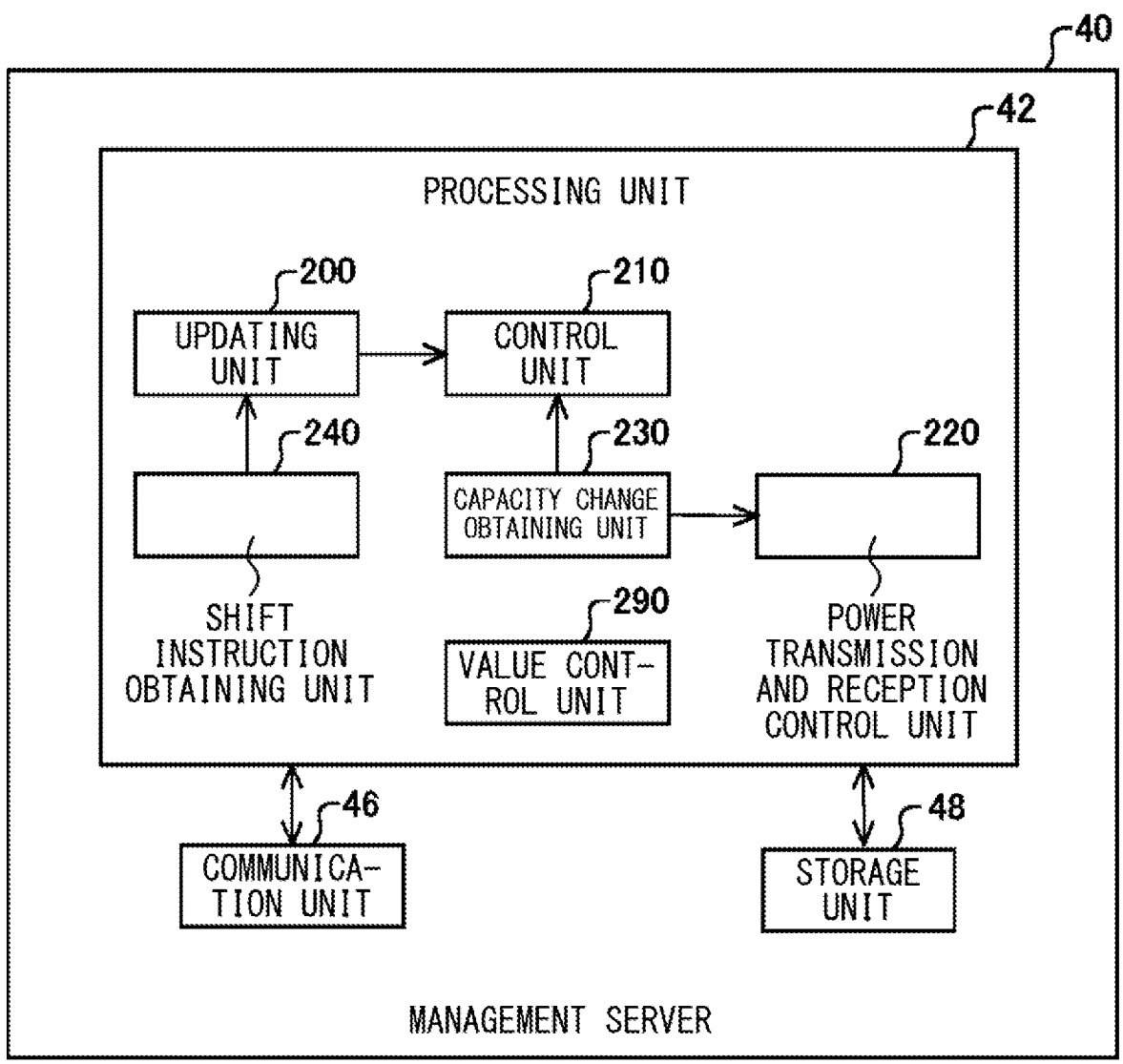
FIG. 2 schematically illustrates a functional configuration of a management server 40.

FIG. 2 schematically illustrates a functional configuration of the management server 40. The management server 40 includes a processing unit 42, a storage unit 48, and a communication unit 46.

The processing unit 42 is implemented by a processing device having a processor. The storage unit 48 is implemented by a non-volatile memory device. The processing unit 42 uses information stored in the storage unit 48 for processing. Communication between the vehicle 30, the stationary battery 14, the user terminal 82, and the power trading server 50 takes place via the communication unit 46. Information received at the communication unit 46 from the vehicle 30, the stationary battery 14, the user terminal 82 and the power trading server 50 is supplied to the processing unit 42. Information to be transmitted to the vehicle 30, the stationary battery 14, the user terminal 82, and the power trading server 50 is generated by the processing unit 42 and transmitted via the communication unit 46.

The management server 40 functions as a capacity control device. The management server 40 may be a system implemented by a single information processing device or a plurality of information processing devices.

The processing unit 42 includes a power transmission and reception control unit 220, an updating unit 200, a control unit 210, a capacity change obtaining unit 230, a shift instruction obtaining unit 240, and a value control unit 290.

The storage unit 48 stores information representing a first remaining capacity and a second remaining capacity of a remaining capacity of the battery 32 mounted on the vehicle 30, the first remaining capacity being available for power transmission and reception between the battery 32 and the power grid 10 without an instruction from the user 80 of the vehicle 30, and the second remaining capacity being available to the user 80 in response to an instruction from the user 80. The updating unit 200 updates the second remaining capacity without updating the first remaining capacity based on a charge amount or a discharge amount of the battery 32, which derives from charge or discharge of the battery 32 performed in accordance with an instruction from the user 80, and updates the first remaining capacity without updating the second remaining capacity based on a charge amount or a discharge amount of the battery 32, which derives from power transmission or reception performed in accordance with an instruction from the management server 40 that is external to the vehicle 30, without an instruction from the user 80.

The remaining capacity for V2G is one example of the first remaining capacity, and the remaining capacity for the user is one example of the second remaining capacity. The control unit 210 presents information representing the second remaining capacity that has been updated by the updating unit 200 to the user 80. For example, the control unit 210 may transmit information representing the second remaining capacity to an ECU of the vehicle 30, and causes the vehicle 30 to display the information representing the second remaining capacity. The control unit 210 may transmit information representing the second remaining capacity to the user terminal 82, and causes the user terminal 82 to display the information representing the second remaining capacity. The control unit 210 may present information representing a charging rate to the user 80, which is obtained based on a maximum capacity and the second remaining capacity of a capacity of the battery 32, and the maximum capacity being available to the user 80 of the vehicle 30.

"The first remaining capacity" is one example of "the first energy amount of an amount of energy accumulated in the power source for driving mounted on the vehicle 30, which is available for power transmission and reception between the power source for driving and the power grid 10, without an instruction from the user 80". Also, "the second remaining capacity" is one example of "the second energy amount available to the user 80 in response to an instruction from the user 80". Further, "a charge amount or a discharge amount of the battery 32, which derives from charge or discharge of the battery 32 performed in accordance with an instruction from the user 80" is one example of "the energy amount accumulated in the power source for driving or an energy amount released from the power source for driving in accordance with an instruction from the user 80".

The ECU of the vehicle 30 may execute functions of the updating unit 200 and the control unit 210. For example, when the battery 32 is charged or discharged without an instruction from the power transmission and reception control unit 220, the ECU of the vehicle 30 may update the second remaining capacity based on a charge amount or a discharge amount, and present the updated second remaining capacity to the user 80. The functions of the updating unit 200 and the control unit 210 may be implemented by at least one of a control device such as the ECU of the vehicle 30, and the management server 40.

The capacity change obtaining unit 230 obtains an instruction to change a maximum capacity available to the user 80. For example, the capacity change obtaining unit 230 may obtain the instruction to change the maximum capacity available to the user 80 from the user terminal 82 or the ECU of the vehicle 30. The control unit 210 presents information representing a new charging rate to the user 80, which is obtained based on the maximum capacity that has been changed and the second remaining capacity.

The shift instruction obtaining unit 240 obtains an instruction to shift from one of the first remaining capacity and the second remaining capacity to the other. The shift instruction obtaining unit 240 may obtain an instruction to shift from the first remaining capacity to the second remaining capacity from the user 80. The shift instruction obtaining unit 240 may obtain an instruction to shift from the first remaining capacity to the second remaining capacity from the user terminal 82 or the ECU of the vehicle 30. When the instruction to shift is obtained, the updating unit 200 updates the first remaining capacity and the second remaining capacity based on a capacity to be shifted from one of the first remaining capacity and the second remaining capacity to the other. When a power demand in the power grid 10 is lower than a predetermined value, the shift instruction obtaining unit 240 may permit accepting the instruction to shift from the first remaining capacity to the second remaining capacity from the user 80. When a power demand in the power grid 10 is higher than the predetermined value, the shift instruction obtaining unit 240 may permit accepting the instruction to shift from the second remaining capacity to the first remaining capacity from the user 80.

The value control unit 290 determines a cost of shifting a capacity from one of the first remaining capacity and the second remaining capacity to the other based on a power demand in the power grid 10. The control unit 210 presents the cost determined by the value control unit 290 to the user 80.

According to a power demand in the power grid 10, the power transmission and reception control unit 220 causes power transmission and reception between the vehicle 30 and the power grid 10. For example, the power transmission and reception control unit 220 instructs the ECU mounted on the vehicle 30 to charge or discharge the battery 32. According to the instruction from the power transmission and reception control unit 220, the ECU of the vehicle 30 communicates with the charging and discharging facility 20 and controls a power converter of the vehicle 30 in order to charge the battery 32 through the charging and discharging facility 20 or release power obtained from discharging the battery 32. Note that, the power transmission and reception control unit 220 may sequentially obtain, from the ECU of the vehicle 30, information representing an amount of power input from the charging and discharging facility 20 to the power converter at a time of charging the battery 32, an amount of power output from the power converter to the charging and discharging facility 20 at a time of discharging the battery 32, and SOC (State of Charge) of the battery 32. The power transmission and reception control unit 220 may control power transmission and reception between the vehicle 30 and the power grid 10 based on the information obtained from the ECU of the vehicle 30.

When the second remaining capacity is lower than a predetermined value, the power transmission and reception control unit 220 may prohibit power transmission and reception between the battery 32 and the power grid 10 during a charge of the battery 32 even if the first remaining capacity is higher than a predetermined value.

By virtue of the management server 40, a remaining capacity to be presented to the user 80 does not reflect charge and discharge of the battery 32 freely performed by the management server 40 within a limit of the remaining capacity for V2G. Therefore, the user 80 does not feel uncomfortable even when the management server 40 performs charge or discharge without permission. In addition, the management server 40 can systematically charge or discharge the battery 32 within a limit of the remaining capacity for V2G without substantially being affected by charge or discharge performed by the user 80.

A function of a power transmission and reception management device may be implemented solely by the management server 40, or implemented by a combination of the management server 40 and the ECU of the vehicle 30. For example, at least a part of processing may be executed by the ECU of the vehicle 30 instead of the management server 40. For another example, at least a part of a function may be implemented by the ECU of the vehicle 30 instead of the power transmission and reception control unit 220, the updating unit 200, the control unit 210, the capacity change obtaining unit 230, the shift instruction obtaining unit 240, the value control unit 290, or the storage unit 48.

Figure 3:
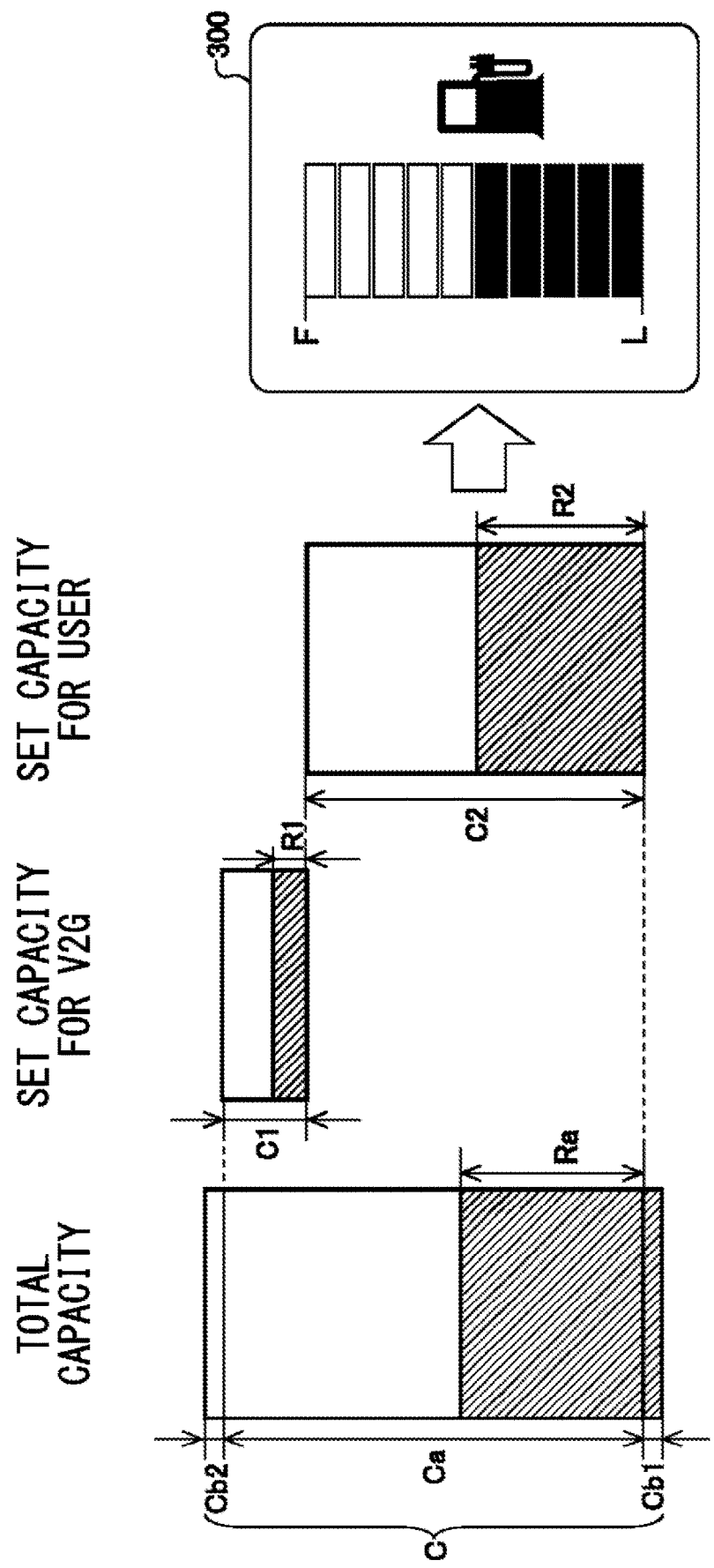
FIG. 3 is a typical diagram explaining a set capacity for a user and a set capacity for V2G.

FIG. 3 is a typical diagram explaining a set capacity for the user and a set capacity for V2G. In FIG. 3, a total capacity of the battery 32 is indicated with C. For example, a full charge capacity of the battery 32 may be indicated with C. An available capacity that is available to the user and the power aggregator is indicated with Ca. Ca is less than C.

A minimum charge capacity of the battery 32 is indicated with Cb1. The ECU of the vehicle 30 controls a discharge of the battery 32 such that SOC of the battery 32 does not become below SOC corresponding to Cb1. A capacity prohibited to be charged of the battery 32 is indicated with Cb2. For example, in order to prevent an overcharge of the battery 32, the ECU of the vehicle 30 controls a charge of the battery 32 such that SOC does not exceed SOC corresponding to Cb2. It is assumed that each of Cb1 and Cb2 is specifically 5% of C. In this case, the ECU of the vehicle 30 controls charge and discharge of the battery 32 such that SOC stays within a range of from 5% to 95%.

The updating unit 200 manages the available capacity Ca by dividing the available capacity Ca into a set capacity C1 for V2G and a set capacity C2 for the user. The user 80 can set the set capacity C1 for V2G and the set capacity C2 for the user. The set capacity C1 for V2G and the set capacity C2 for the user may be set in advance when the user 80 purchases the vehicle 30.

The set capacity C1 for V2G indicates a maximum capacity to be charged or discharged of the battery 32 in accordance with an instruction from the power aggregator. The set capacity C2 for the user indicates a maximum capacity to be charged and discharged of the battery 32 in accordance with an instruction from the user 80. The remaining capacity R1 for V2G indicates a capacity currently available for charge and discharge in response to an instruction from the power aggregator. The remaining capacity R2 for the user indicates a capacity currently available for charge and discharge in response to an instruction from the user 80. Here, Ra=R1+R2.

The management server 40 performs V2G between the vehicle 30 and the power grid 10 within a range of the set capacity C1 for V2G. The remaining capacity R2 for the user remains unchanged even when the battery 32 is discharged due to this V2G. Therefore, the user 80 can travel in the vehicle 30 without worrying about the V2G performed by the management server 40. Note that, although the user 80 can usually travel in the vehicle 30 within a range of the set capacity C2 for the user, the user 80 can also travel in the vehicle 30 by using the remaining capacity R1 for V2G when the remaining capacity R1 for V2G is drastically decreased or at a time of emergency etc.

In FIG. 3, a battery remaining amount meter 300 shows typical contents displayed on a battery remaining amount meter displayed in the vehicle 30. The battery remaining amount meter 300 displays the remaining capacity R2 for the user. For example, the control unit 210 may notify the vehicle 30 of the remaining capacity R2 for the user and cause the battery remaining amount meter 300 to display the remaining capacity R2 for the user.

FIG. 4 illustrates one example of capacity information of the battery 32 in a table. The capacity information is stored in the storage unit 48. The capacity information includes a vehicle ID, a user ID, a total capacity, an available capacity, a capacity for V2G, a remaining capacity for V2G, and a remaining capacity for a user which are mutually associated.

Identification information of the vehicle 30 is stored in the vehicle ID. Identification information of the user 80 is stored in the user ID. Information representing the total capacity C of the battery 32 is stored in the total capacity. Information representing Ca is stored in the available capacity. For example, information representing a ratio of Ca to the total capacity C is stored in the available capacity.

Information representing the set capacity C1 for V2G is stored in the set capacity for V2G. For example, information representing a ratio of the set capacity C1 for V2G to the available capacity Ca is stored in the set capacity for V2G.

Information representing the remaining capacity R1 for V2G is stored in the remaining capacity for V2G. For example, information representing a ratio of the remaining capacity R1 for V2G to the set capacity C1 for V2G is stored in the remaining capacity for V2G.

Information representing the remaining capacity R2 for the user is stored in the remaining capacity for the user. For example, information representing a ratio of the remaining capacity R2 for the user to the set capacity C2 for the user is stored in the remaining capacity for the user.

The management server 40 obtains information representing a charge amount and a discharge amount of the battery 32 from the ECU of the vehicle 30. For example, the management server 40 receives information representing an amount of electricity charged in the battery 32 at a time of charging the battery 32, and an amount of electricity discharged from the battery 32 at a time of discharging the battery 32. The updating unit 200 updates the remaining capacity R1 for V2G and the remaining capacity R2 for the user based on the obtained information representing the charge amount and the discharge amount.

Figure 5:
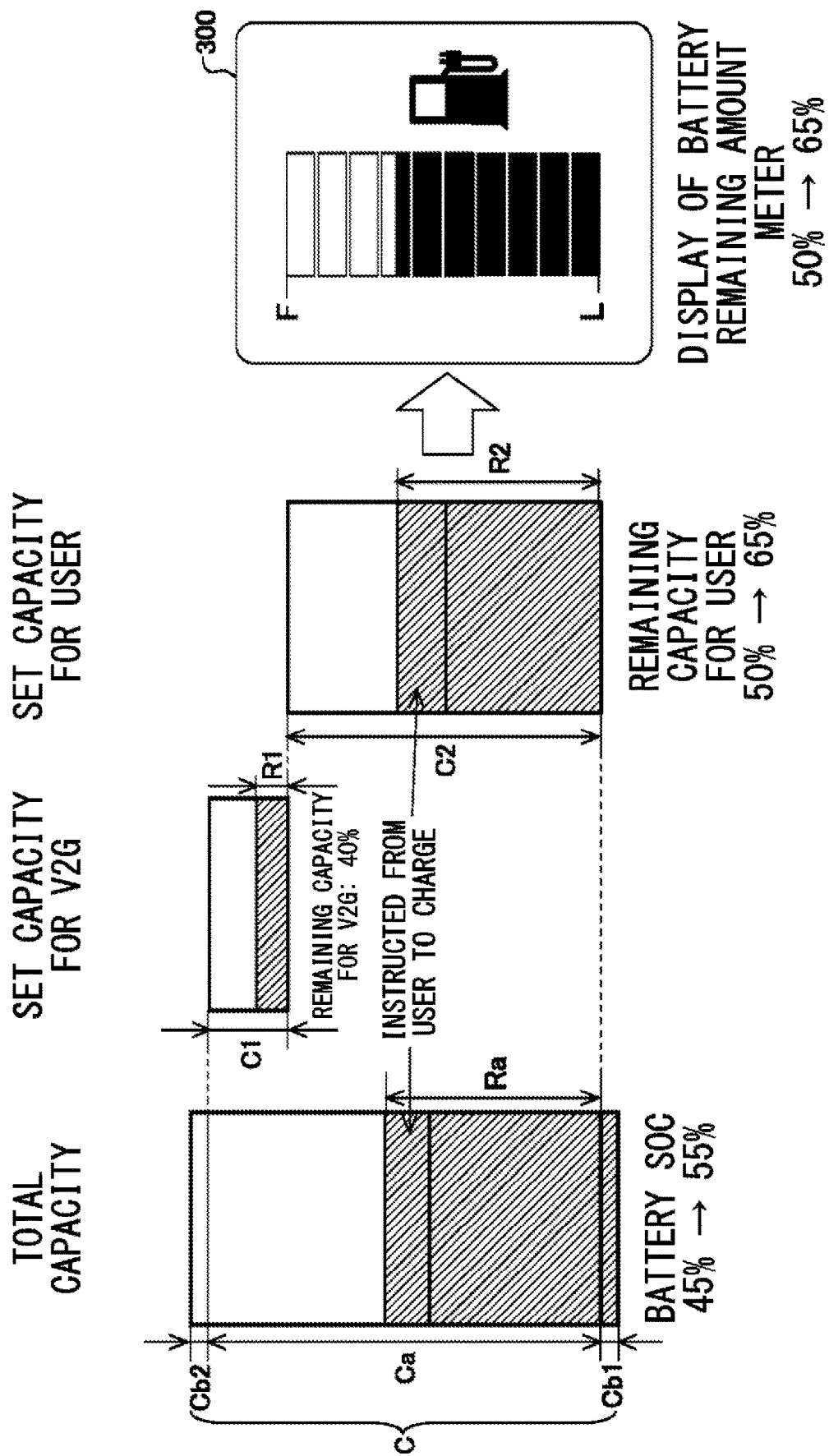
FIG. 5 illustrates a typical state in which a remaining capacity R1 for V2G is updated according to a charge that is performed in accordance with an instruction from a user 80.

FIG. 5 illustrates a typical state in which the remaining capacity R1 for V2G is updated according to a charge that is performed in accordance with an instruction from the user 80. In FIG. 5, it is assumed that the set capacity C1 for V2G and the set capacity C2 for the user are approximately 10 kWh and 40 kWh, respectively, and the remaining capacity R1 for V2G and the remaining capacity R2 for the user are 40% and 50% before charging, respectively.

When the user 80 sets the vehicle 30 to be in a charge mode and connects the vehicle 30 to a charging and discharging facility 20 at home or the like, the ECU of the vehicle 30 initiates a charge of the battery 32 according to an instruction from the user 80. When the vehicle 30 is charged at a rate of approximately 6 kWh in this manner, the updating unit 200 updates the remaining capacity R2 for the user from 50% to 65%. In addition, the control unit 210 updates a remaining amount displayed on the battery remaining amount meter 300 of the vehicle 30 to 65%. Here, the updating unit 200 does not update the remaining capacity R1 for V2G.

When the user 80 travels in the vehicle 30 by using power from the battery 32, the updating unit 200 updates the remaining capacity R2 for the user. For example, when the battery 32 is discharged at a rate of approximately 6 kWh in order to travel in the vehicle 30, the updating unit 200 updates the remaining capacity R2 for the user from 50% to 35%. In addition, the control unit 210 causes the ECU of the vehicle 30 to update the remaining amount displayed on the battery remaining amount meter 300 of the vehicle 30 to 35%. Here, the updating unit 200 does not update the remaining capacity R1 for V2G.

When V2G is performed according to an instruction from the user 80, the updating unit 200 updates the remaining capacity R2 for the user. For example, when the user 80 connects the vehicle 30 to the charging and discharging facility 20 at home and transmits power to the power grid 10 by discharging the battery 32 through a HEMS at home, and if the battery 32 is discharged at a rate of approximately 6 kWh at the time, then the updating unit 200 updates the remaining capacity R2 for the user from 50% to 35%. In addition, the control unit 210 causes the ECU of the vehicle 30 to update the remaining amount displayed on the battery remaining amount meter 300 of the vehicle 30 to 35%. Here, the updating unit 200 does not update the remaining capacity R1 for V2G.

Similarly, when the user 80 charges the battery 32 with surplus power of the power grid 10 through the HEMS at home, the updating unit 200 updates the remaining capacity R2 for the user but does not update the remaining capacity R1 for V2G. When the user 80 supplies a household electric appliance with power by discharging the battery 32 through the HEMS at home, again, the updating unit 200 updates the remaining capacity R2 for the user but does not update the remaining capacity R1 for V2G. Further, when the user 80 charges the battery 32 with power obtained from a household solar battery of the user 80 through the HEMS at home, again, the updating unit 200 updates the remaining capacity R2 for the user but does not update the remaining capacity R1 for V2G.

In this way, the remaining capacity R2 for the user is updated according to an amount used by the battery 32 in accordance with an instruction from the user 80. Therefore, the user 80 can be provided with remaining capacity information that matches a sense of usage felt by the user 80.

Figure 6:
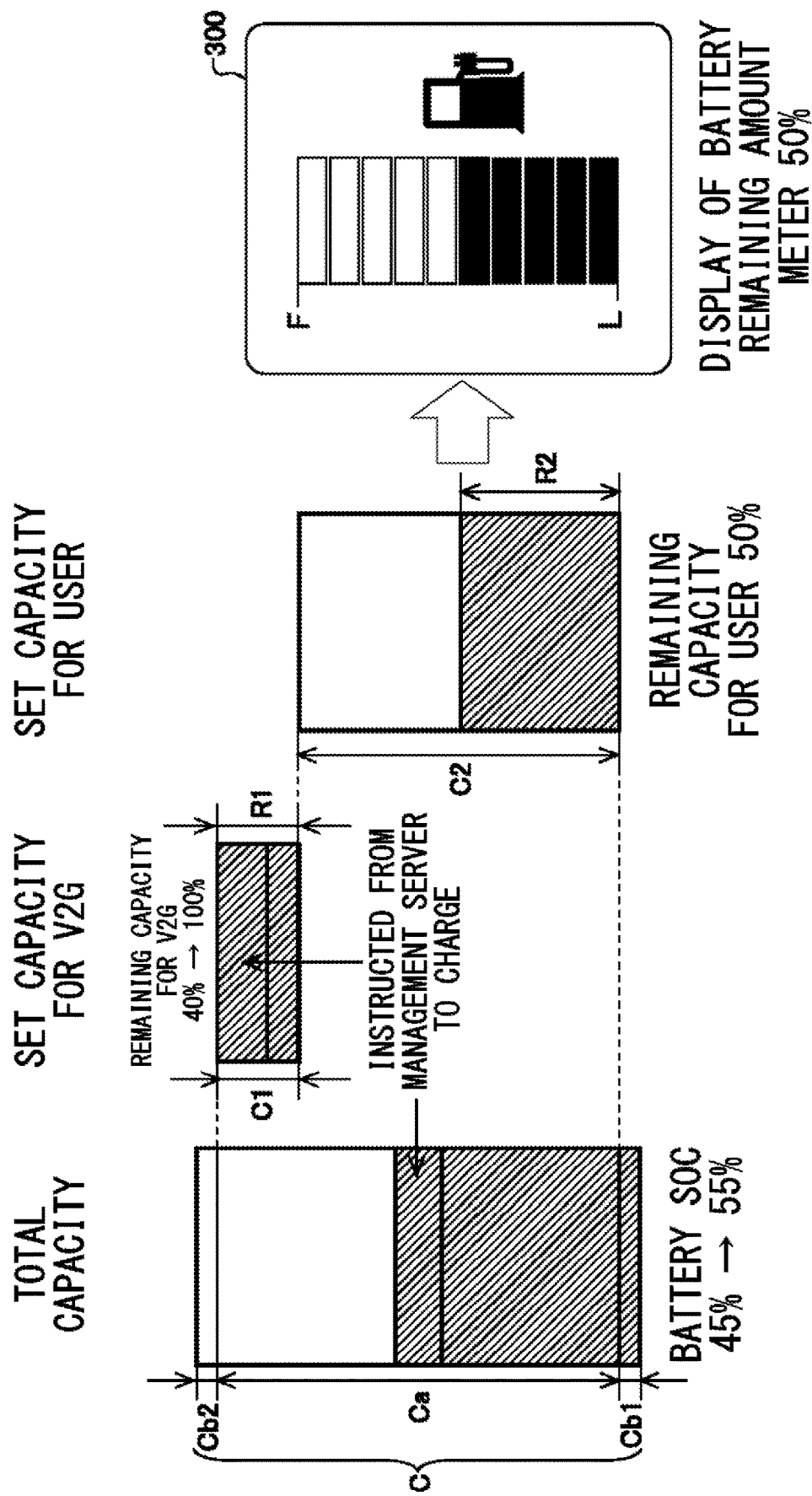
FIG. 6 illustrates a typical state in which the remaining capacity R1 for V2G is updated according to a charge that is performed in accordance with an instruction from the management server 40.

FIG. 6 illustrates a typical state in which the remaining capacity R1 for V2G is updated according to a charge that is performed in accordance with an instruction from the management server 40. In FIG. 6, it is assumed that the set capacity C1 for V2G and the set capacity C2 for the user are approximately 10 kWh and 40 kWh, respectively, and the remaining capacity R1 for V2G and the remaining capacity R2 for the user are 40% and 50% before charging, respectively.

When the user 80 sets the vehicle 30 to be in a charge mode and connects the vehicle 30 to the charging and discharging facility 20 at home or the like, the ECU of the vehicle 30 initiates a charge of the battery 32 according to an instruction from the user 80. When the remaining capacity R2 for the user reaches a predetermined reference value in this charge, the ECU of the vehicle 30 permits the power transmission and reception control unit 220 to control charge and discharge of the battery 32.

When the power transmission and reception control unit 220 causes, while the power transmission and reception control unit 220 is permitted to control charge and discharge of the battery 32, the battery 32 to be charged at a rate of approximately 6 kWh of power from the power grid 10, the updating unit 200 updates the remaining capacity R1 for V2G from 40% to 100%. Here, the updating unit 200 does not update the remaining capacity R2 for the user. The ECU of the vehicle 30 maintains a remaining amount displayed on the battery remaining amount meter 300 of the vehicle 30 at 50%.

When the power transmission and reception control unit 220 causes, while the power transmission and reception control unit 220 is permitted to control charge and discharge of the battery 32, the battery 32 to be discharged at a rate of approximately 4 kWh in power transmission from the battery 32 to the power grid 10, the updating unit 200 updates the remaining capacity R1 for V2G from 40% to 0%. Here, the updating unit 200 does not update the remaining capacity R2 for the user. In addition, the ECU of the vehicle 30 maintains a remaining amount displayed on the battery remaining amount meter 300 of the vehicle 30 at 50%.

In this way, when charge and discharge of the battery 32 are controlled by the power transmission and reception control unit 220, the remaining capacity R1 for V2G is updated and the remaining capacity R2 for the user is not updated. Therefore, the remaining capacity R1 for V2G is independent from charge and discharge of the battery 32 performed by the user 80, and the remaining capacity R2 for the user is independent from charge and discharge of the battery 32 performed by the management server 40. As a result, the management server 40 can systematically charge or discharge the battery 32 without taking into consideration a remaining capacity of the battery required by the user 80.

Figure 7:
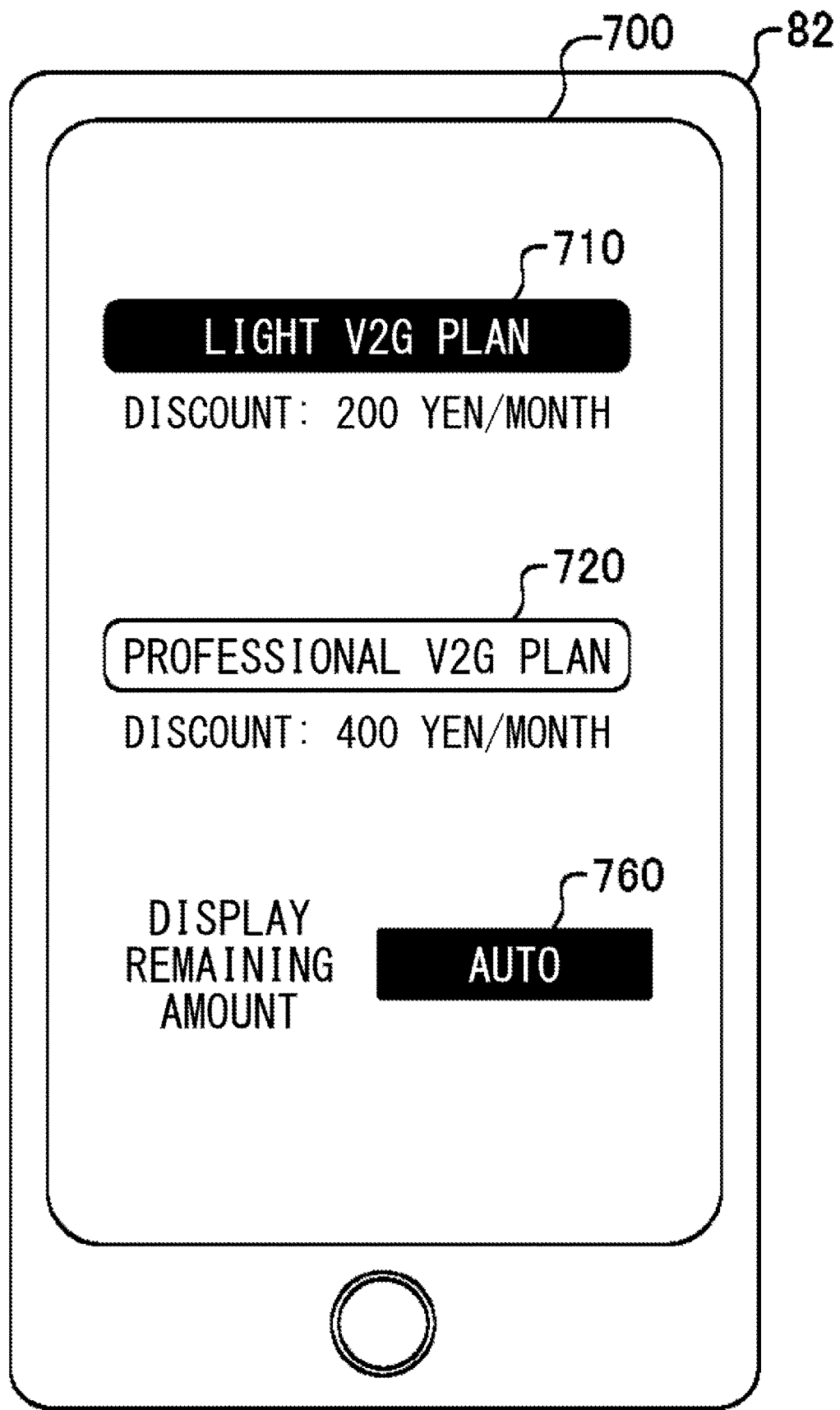
FIG. 7 illustrates one typical example of a screen 700 for setting the set capacity for V2G of a vehicle 30.

FIG. 7 illustrates one typical example of a screen 700 for setting the set capacity C2 for the user and the set capacity C1 for V2G of the vehicle 30. When the user 80 changes the set capacity C1 for V2G, the management server 40 controls such that the screen 700 is displayed on the user terminal 82. The screen 700 includes a plan selection button 710 and a plan selection button 720, and a remaining amount display selection button 760.

The power aggregator offers the user 80 different plans with different set capacity C1 for V2G to be allocated to the battery 32. For example, the power aggregator offers the user 80 a light V2G plan in which a small capacity limit is allocated to the set capacity C1 for V2G, and a professional V2G plan in which a large capacity limit is allocated to the set capacity C1 for V2G. For example, 20% of the available capacity Ca may be allocated to the set capacity C1 for V2G in the light V2G plan, and 50% of the available capacity Ca may be allocated to the set capacity C1 for V2G in the professional V2G plan. The plan selection button 710 is for selecting the light V2G plan being a small capacity plan. The plan selection button 720 is for selecting the professional V2G plan.

In response to the user 80 pushing the plan selection button 710 or the plan selection button 720, the user terminal 82 transmits plan identification information corresponding to the pushed button, and identification information of the user 80 to the management server 40. The capacity change obtaining unit 230 changes the set capacity for V2G, which is illustrated in the capacity information in FIG. 3, based on the plan identification information and the identification information of the user 80 received from the user terminal 82. Note that, according to a total capacity and the set capacity for V2G that has been changed, the set capacity C2 for the user is changed and defined. The updating unit 200 updates the remaining capacity for V2G and the remaining capacity for the user based on the set capacity for V2G that has been changed, and the set capacity for V2G, a remaining capacity for V2G and a remaining capacity for the user before being changed.

Each plan has a set cost to be given to the user 80. For the user 80 using the charging and discharging facility 20 at a place other than his/her home, the cost may be a discount amount from a monthly fee imposed on the user 80. The professional V2G plan may be set with a discount amount larger than a discount amount set in the light V2G plan. Discount amounts corresponding to each of the plan selection button 710 and the plan selection button 720 are displayed on the screen 700. A discount amount that is set to correspond to the plan selected by the user 80 is subtracted from the monthly fee by the value control unit 290 of the management server 40.

On the screen 700, the remaining amount display selection button 760 is for selecting a display method of a remaining amount indicated by the battery remaining amount meter 300 of the vehicle 30. The display method of the remaining amount indicated by the battery remaining amount meter 300 includes a first display method of the remaining amount in which the remaining capacity R2 for the user is displayed relative to the set capacity C2 for the user, and a display method in which the remaining capacity R2 for the user is displayed relative to the available capacity Ca. For example, when the first display method of the remaining amount is selected, a ratio of the remaining capacity R2 for the user to the set capacity C2 for the user is displayed. For another example, when a second display method of the remaining amount is selected, a ratio of the remaining capacity R2 for the user to the available capacity Ca is displayed in the vehicle 30. Selecting the remaining amount display selection button 760 on the screen 700 means the first display method of the remaining amount applies. On the other hand, unselecting the remaining amount display selection button 760 means the second display method of the remaining amount applies.

In response to the user 80 pushing the remaining amount display selection button 760, the user terminal 82 transmits identification information on the display method of the remaining amount, and identification information of the user 80 to the management server 40. The control unit 210 instructs the ECU of the vehicle 30 of the user 80 to display the remaining capacity R2 for the user in the display method of the remaining amount identified by the received identification information. Note that, when displaying the remaining capacity R2 for the user in the second display method of the remaining amount, the ECU of the vehicle may separately display the set capacity C1 for V2G and a maximum amount C2 for the user. For example, the set capacity C2 for the user may be more emphasized than the set capacity C1 for V2G on the display so that the user 80 understands that the set capacity C1 for V2G is unavailable.

Figure 8:
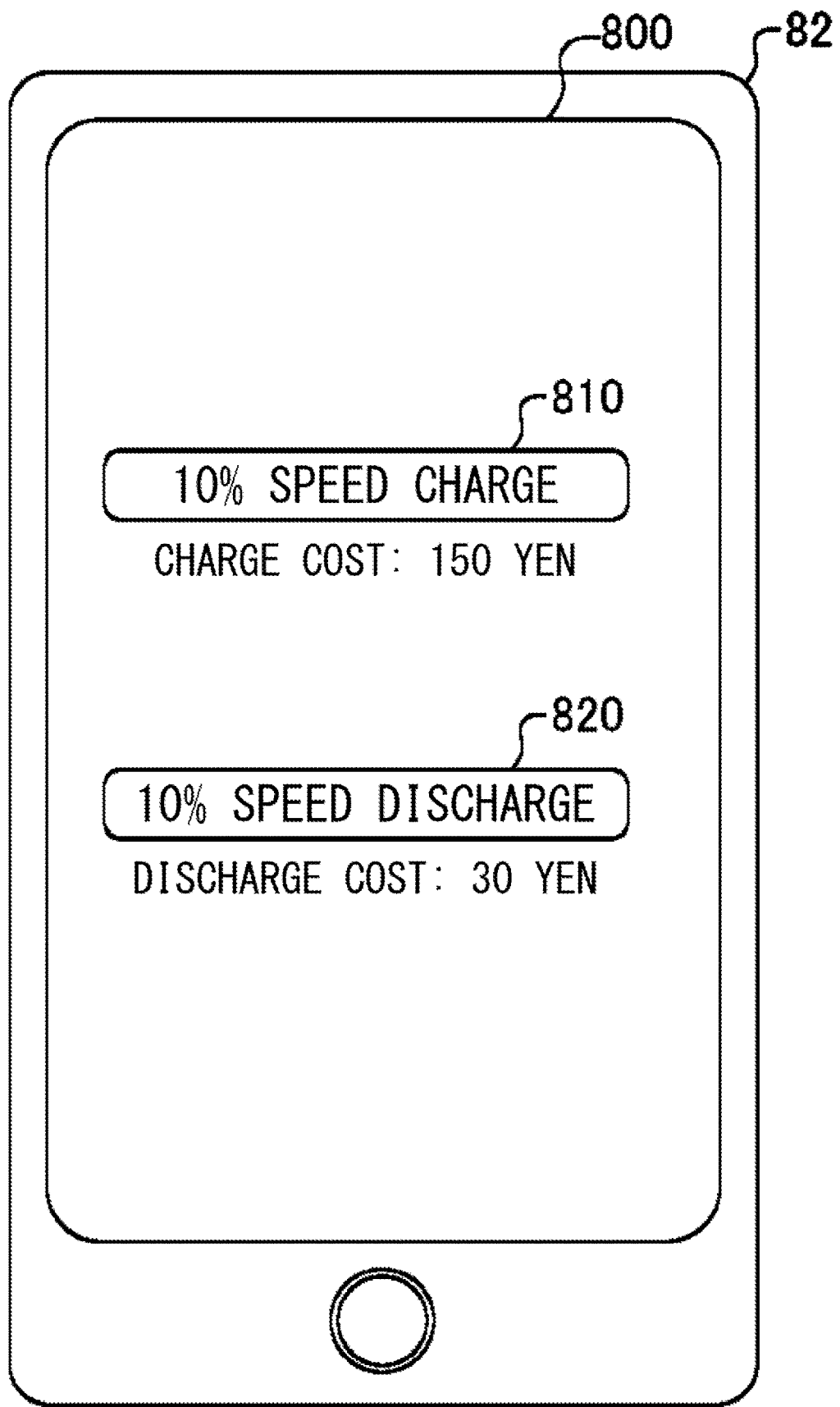
FIG. 8 illustrates one typical example of a screen 800 for shifting a capacity between the remaining capacity R1 for V2G and a remaining capacity R2 for the user.

FIG. 8 illustrates one typical example of a screen 800 for shifting a capacity between the remaining capacity R1 for V2G and the remaining capacity R2 for the user. The management server 40 controls such that the screen 800 is displayed on the user terminal 82 in order to accept an instruction to shift from the user 80. The screen 800 includes a speed charge button 810 and a speed discharge button 820.

In referring to the capacity information illustrated in FIG. 3, a speed charge is achieved by shifting at least a part of the remaining capacity R1 for V2G to the remaining capacity R2 for the user. In referring to the capacity information illustrated in FIG. 3, a speed discharge is achieved by shifting at least a part of the remaining capacity R2 for the user to the remaining capacity R1 for V2G. In other words, the speed charge and the speed discharge are virtually performed by changing capacity information without practically charging or discharging the battery 32.

In response to the user 80 pushing the speed charge button 810, the user terminal 82 transmits information representing a speed charge, information representing a shift capacity to be shifted in the speed charge, and identification information of the user 80 to the management server 40. In response to the user 80 pushing the speed discharge button 820, the user terminal 82 transmits information representing a speed discharge, information representing a shift capacity to be shifted in the speed discharge, and identification information of the user 80 to the management server 40.

In referring to the capacity information in FIG. 3, the updating unit 200 updates the remaining capacity for V2G and the remaining capacity for the user based on the information received from the user terminal 82. For example, when performing the speed charge, the updating unit 200 deducts a shift capacity from the remaining capacity for V2G and adds the shift capacity to the remaining capacity for the user. When performing the speed discharge, the updating unit 200 deducts a shift capacity from the remaining capacity for the user and adds the shift capacity to the remaining capacity for V2G. In addition, the control unit 210 causes the ECU of the vehicle 30 to update the remaining amount displayed on the battery remaining amount meter 300 in the vehicle 30 based on the updated remaining capacity for the user.

The speed charge and the speed discharge are permitted in consideration of a power demand in the power grid 10. For example, the shift instruction obtaining unit 240 permits accepting the speed charge when the power demand in the power grid 10 is lower than a predetermined value. For another example, acceptance of the speed charge is permitted when the remaining capacity R1 for V2G is larger than a predetermined value, under a confirmed contract on a purchase of a power aggregator in a wholesale power market.

The shift instruction obtaining unit 240 permits accepting the speed discharge when the power demand in the power grid 10 is higher than a predetermined value. For example, acceptance of the speed discharge is permitted when the remaining capacity R1 for V2G is lower than a predetermined value, under a confirmed contract on a sale of a power aggregator in a wholesale power market.

Note that, the shift instruction obtaining unit 240 may cause the speed charge button 810 to be selectable on a display of the user terminal 82 when a power demand in the power grid 10 is lower than a predetermined value, and the remaining capacity R1 for V2G is larger than a predetermined value. The shift instruction obtaining unit 240 may cause the speed discharge button 820 to be selectable on a display of the user terminal 82 when a power demand in the power grid 10 is higher than the predetermined value, and the remaining capacity R1 for V2G is lower than the predetermined value.

Each of the shift capacity in the speed charge and the shift capacity in the speed discharge may be a predetermined capacity. A ratio of the shift capacity in the speed charge or the shift capacity in the speed discharge to the set capacity C2 for the user may be indicated. Also, the speed charge and the speed discharge are set with a cost to be imposed on the user 80 and a cost to be given to the user 80, respectively. Information representing the cost corresponding to each of the speed charge button 810 and the speed discharge button 820 is displayed on the screen 800. Note that, the cost may be determined based on a power demand in the power grid 10. The higher the power demand in the power grid 10 is, the more expensive a unit price per unit capacity for the speed charge may be, and the less expensive a unit price per unit capacity for the speed discharge may be. The lower the power demand in the power grid 10 is, the less expensive a unit price per unit capacity for the speed charge may be, and the more expensive a unit price per unit capacity for the speed discharge may be.

By virtue of the power transmission and reception system 100, functions of the speed charge and the speed discharge can be provided. Therefore, for example, when the remaining capacity R2 for the user is low but a long-distance travel is urgently required, the remaining capacity R2 for the user can be instantly increased.

Figure 9:
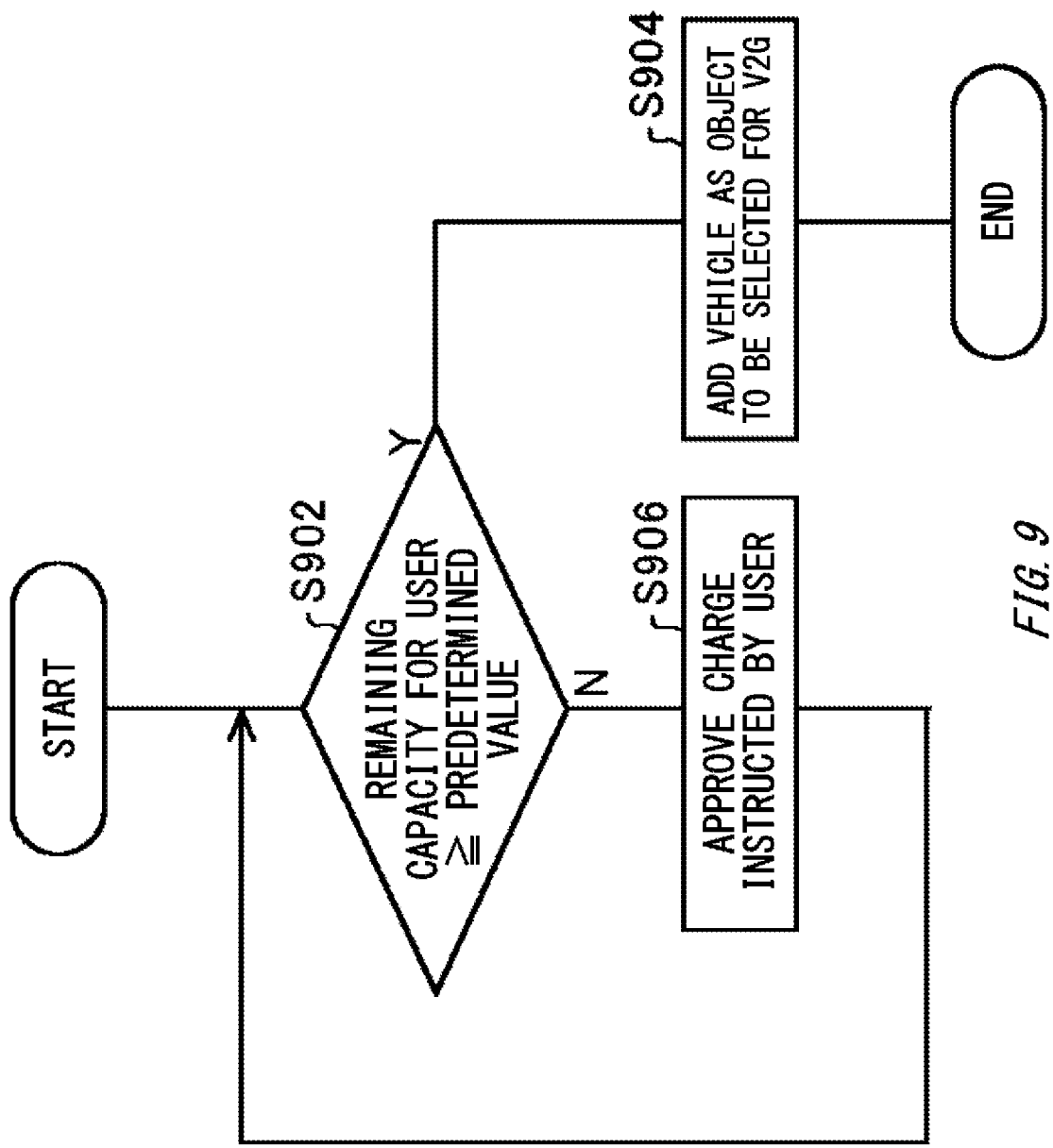
FIG. 9 is a flowchart showing processing to be performed upon connecting a charging and discharging cable 22 to a vehicle 30.

FIG. 9 is a flowchart showing processing to be performed upon connecting the charging and discharging cable 22 to the vehicle 30. The flowchart in FIG. 9 is mainly performed by the processing unit 42 of the management server 40.

In S902, in response to receiving a notification telling that the charging and discharging cable 22 has been connected to the vehicle 30 from the ECU of the vehicle 30, the power transmission and reception control unit 220 determines whether the remaining capacity R2 for the user is a predetermined value or more. When the remaining capacity R2 for the user is the predetermined value or more, the power transmission and reception control unit 220 adds the vehicle 30 as an object to be selected for V2G in S904. As described below, the power transmission and reception control unit 220 selects a vehicle 30 to be used for power transmission and reception with the power grid 10 among a plurality of vehicles 30 being an object to be selected for V2G. Note that, when the battery 32 is specified for a timer charge by the user 80, the power transmission and reception control unit 220 adds the vehicle 30 as an object to be selected for V2G except for a period in which the timer charge is performed.

When the remaining capacity R2 for the user is determined to be less than the predetermined value in S902, the power transmission and reception control unit 220 approves that the ECU of the vehicle 30 performs charging according to an instruction from the user 80 in S906. The power transmission and reception control unit 220 does not allow power transmission and reception between the vehicle 30 and the power grid 10 while the charge is taking place according to the instruction from the user 80. In this way, when the remaining capacity R2 for the user is low, increasing the remaining capacity R2 for the user can be top priority.

Figure 10:
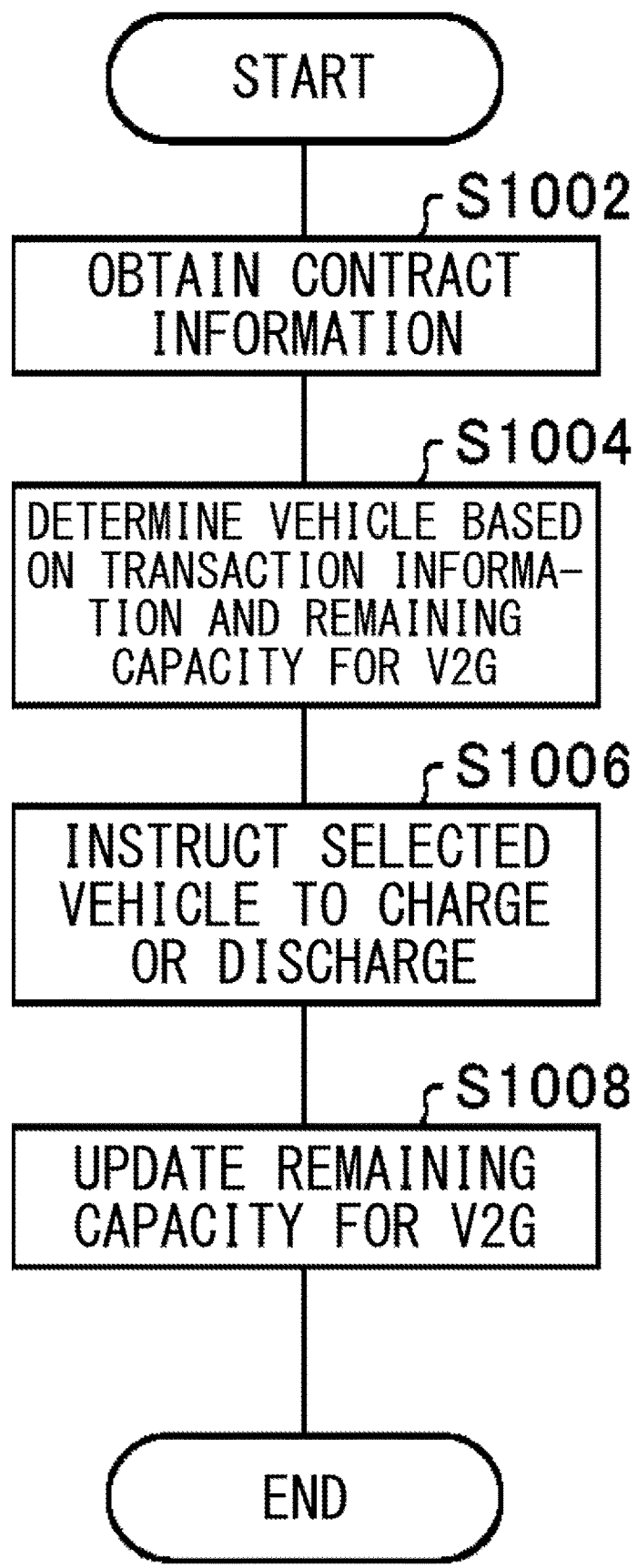
FIG. 10 is a flowchart showing processing of power transmission and reception between the vehicle 30 and a power grid 10.

FIG. 10 is a flowchart showing processing of power transmission and reception between the vehicle 30 and the power grid 10. The flowchart in FIG. 10 is mainly performed by the processing unit 42 of the management server 40.

In S1002, the power transmission and reception control unit 220 obtains contract information of a power trade from the storage unit 48. The contract information includes time frame information, contract price information, contract amount information, and contract type information. In S1004, the power transmission and reception control unit 220 determines a vehicle 30 to be used for power transmission and reception with the power grid 10, and a period of the power transmission and reception based on transaction information and the remaining capacity R1 for V2G of the vehicle 30.

In S1006, the power transmission and reception control unit 220 instructs an ECU of the vehicle 30 selected in S1004 to charge or discharge. In S1008, the updating unit 200 updates the remaining capacity R1 for V2G based on a charge amount or a discharge amount obtained from the ECU of the vehicle 30.

By virtue of the power transmission and reception system 100 described above, the management server 40 can freely charge or discharge the battery 32 within a limit of the remaining capacity R1 for V2G that is allocated for the management server 40, without being affected by charge or discharge performed by the user 80. In this case, a remaining capacity to be presented to the user 80 remains unchanged even when charge and discharge are performed in accordance with an instruction from the management server 40. The remaining capacity to be presented to the user 80 is updated according to an amount of charge and discharge of the battery 32 performed in accordance with an instruction from the user 80. Therefore, the user 80 can be provided with remaining capacity information that matches a sense of usage felt by the user 80.

The above-mentioned contract information about the power trade is one example of information representing a power demand. The information representing the power demand may be, for example, a contract price in the power trade. Also, the information representing the power demand may be information representing a real-time imbalance quantity between supply and demand in the power grid 10, or may be information representing a predicted value of an imbalance quantity between supply and demand in future. The information representing the power demand may be information representing an amount of real-time power consumption of a power consumer of the power grid 10 or a predicted value of this power consumption. The information representing the power demand is not limited to an amount of power itself, and thus a variety of information directly or indirectly impacting the power demand may apply such as temperature information, humidity information, weather information, event information, and the like.

An example of the power trading market includes a day-ahead market, an intra-day market, a demand and supply balancing market, and the like. A variety of types of trading may apply to the power trading other than the types of trading in these power trading markets.

Figure 11:
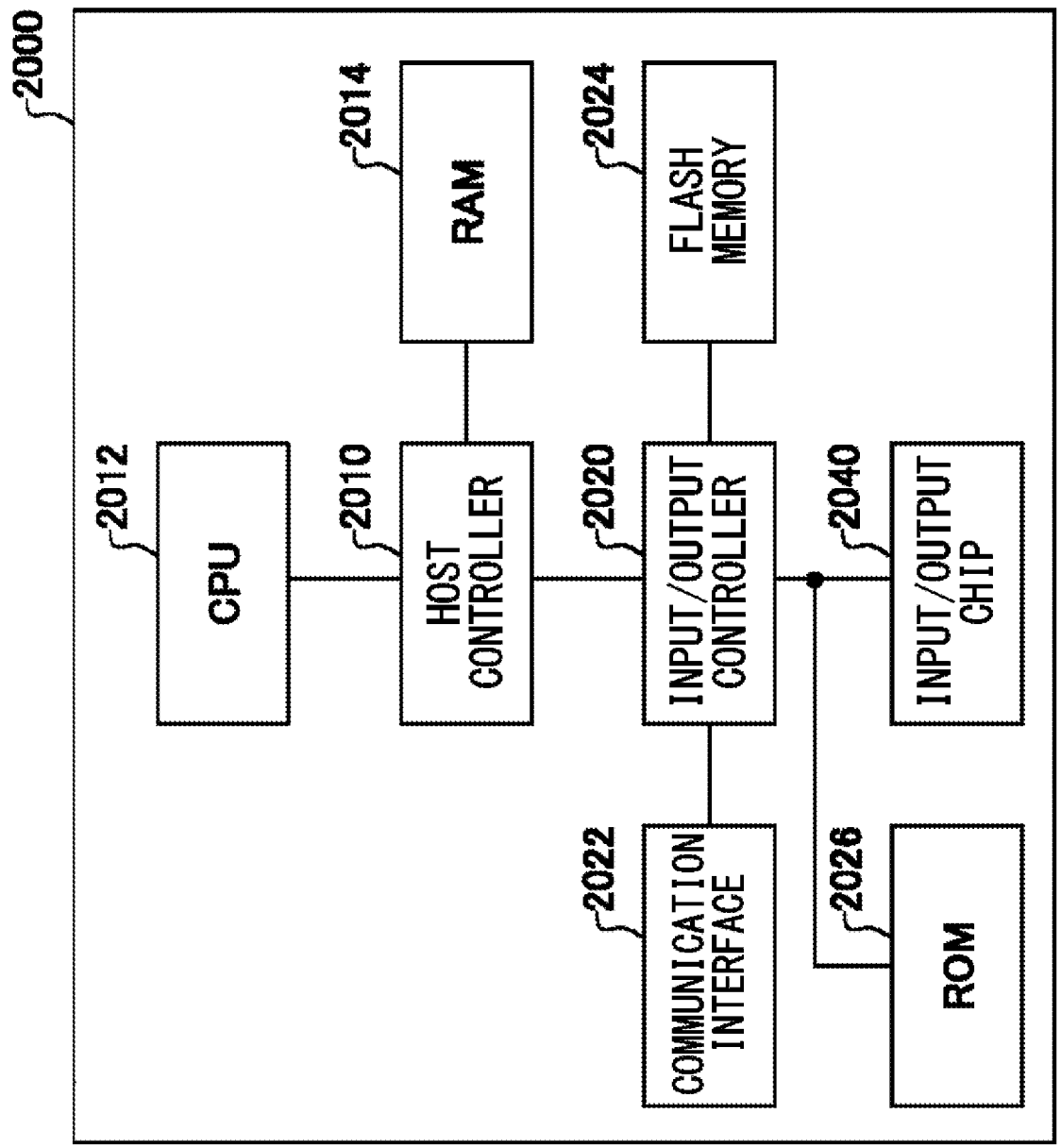
FIG. 11 illustrates an example of a computer 2000 in which a plurality of embodiments of the present invention may be entirely or partially embodied.

FIG. 11 illustrates an example of a computer 2000 in which a plurality of embodiments of the present invention can be entirely or partially embodied. A program installed in the computer 2000 can cause the computer 2000 to function as a device such as the management server 40 according to the embodiments or each unit in this device, to perform operations associated with the device or each unit of the device, and/or to perform processes according to the embodiments or steps of these processes. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input and output chip 2040. The ROM 2026, the flash memory 2024, the communication interface 2022, and the input and output chip 2040 are connected to the host controller 2010 via an input and output controller 2020.

The CPU 2012 operates according to programs stored in the ROM 2026 and the RAM 2014, thereby controlling each unit.

The communication interface 2022 communicates with other electronic devices via a network. The flash memory 2024 stores a program and data used by the CPU 2012 in the computer 2000. The ROM 2026 stores a boot program or the like executed by the computer 2000 during activation, and/or a program depending on hardware of the computer 2000. The input and output chip 2040 may also connect various input and output units such as a keyboard, a mouse, and a monitor, to the input and output controller 2020 via input and output ports such as a serial port, a parallel port, a keyboard port, a mouse port, a monitor port, a universal serial bus (USB) port, a high-definition multimedia interface (HDMI (registered trademark)) port.

The program is provided via a network or a computer-readable medium such as a CD-ROM, a DVD-ROM, or a memory card. The RAM 2014, the ROM 2026, or the flash memory 2024 is an example of the computer-readable medium. The program is installed in the flash memory 2024, the RAM 2014 or the ROM 2026 and executed by the CPU 2012. Information processing written in these programs is read by the computer 2000, and provides cooperation between the programs and the various types of hardware resources mentioned above. An apparatus or a method may be configured by implementing operations or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and perform various types of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval and replacement, or the like described in this specification and specified by instruction sequences of the programs, and write back a result into the RAM 2014. In addition, the CPU 2012 may search for information in a file, a database, or the like in the recording medium. For example, when a plurality of entries, each having an attribute value of a first attribute associated with an attribute value of a second attribute, is stored in the recording medium, the CPU 2012 may search for an entry having a designated attribute value of the first attribute that matches a condition from the plurality of entries, and read the attribute value of the second attribute stored in the entry, thereby obtaining the attribute value of the second attribute associated with the first attribute that satisfies a predetermined condition.

The programs or a software module described above may be stored on the computer 2000 or in a computer-readable medium near the computer 2000. A recording medium provided in a server system connected to a dedicated communication network or the Internet, such as a hard disk or RAM, can be used as the computer-readable medium. The programs stored in the computer-readable medium may be provided to the computer 2000 via the network.

A program installed in the computer 2000 in order to cause the computer 2000 to function as the management server 40 may act on the CPU 2012 and the like so that the computer 2000 functions as each unit of the management server 40. Upon being read by the computer 2000, the information processing written in these programs functions as a concrete mean being the updating unit 200, the control unit 210, the power transmission and reception control unit 220, the capacity change obtaining unit 230, the shift instruction obtaining unit 240, or the value control unit 290, which are provided through cooperation of software and each type of hardware resources mentioned above. By means of these concrete means, information is calculated or processed to suit a purpose of use of the computer 2000 in the present embodiment, thereby a distinctive management server 40 to suit the purpose of use is constructed.

Various embodiments have been described with reference to the block diagrams and the like. In the block diagrams, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable medium, and/or a processor supplied along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer-readable medium may include any tangible device capable of storing an instruction to be executed by an appropriate device, so that the computer-readable medium having the instruction stored thereon constitutes at least a part of a product including an instruction that may be executed in order to provide means to execute an operation specified by a processing procedure or a block diagram. Examples of the computer-readable media may include an electronic storage medium, a magnetic storage medium, an optical storage medium, an electromagnetic storage medium, a semiconductor storage medium, and the like. More specific examples of the computer-readable media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

The computer-readable instruction may include either a source code or an object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

Computer-readable instructions may be provided to a processor of a general purpose computer, a special purpose computer, or other programmable data processing apparatus, or to programmable circuit, locally or via a local area network (LAN), wide area network (WAN) such as the Internet, and a computer-readable instruction may be executed to provide means for performing operations specified in the described processing procedures or block diagrams. Examples of processors include computer processors, processing units, microprocessors, digital signal processors, controllers, microcontrollers, and the like.

While the embodiments of the present invention have been described, the technical scope of the present invention is not limited to the above-described embodiments. It is apparent to persons skilled in the art that various alterations and improvements can be added to the above-described embodiments. Further, to the extent that there is no technical contradiction, the matters described for the specific embodiment can be applied to other embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, specification, or diagrams can be performed in any order as long as the order is not indicated by "prior to," "before," or the like and as long as the output from a previous process is not used in a later process. Even if the operation flow is described using phrases such as "first" or "next" in the claims, specification, or diagrams, it does not necessarily mean that the process must be performed in this order.

EXPLANATION OF REFERENCES

10: power grid;
12: power generation equipment;
14: stationary battery;
20: charging and discharging facility;
22: charging and discharging cable;
30: vehicle;
32: battery;
40: management server;
42: processing unit;
46: communication unit;
48: storage unit;
50: power trading server;
80: user;
82: user terminal;
100: power transmission and reception system;
200: updating unit;
210: control unit;
220: power transmission and reception control unit;
230: capacity change obtaining unit;
240: shift instruction obtaining unit;
290: value control unit;

300: battery remaining amount meter;
700: screen;
710: plan selection button;
720: plan selection button;
760: remaining amount display selection button;
800: screen;
810: speed charge button;
820: speed discharge button;
2000: computer;
2010: host controller;
2012: CPU;
2014: RAM;
2020: input and output controller;
2022: communication interface;
2024: flash memory;
2026: ROM;
2040: input and output chip

What is claimed is:

1. A capacity control device, comprising:
a storage unit for storing information representing a first energy amount and a second energy amount of an amount of energy accumulated in a power source for driving mounted on a vehicle, the first energy amount being available for power transmission and reception between the power source for driving and a power grid without an instruction from a user of the vehicle, and the second energy amount being available to the user in response to an instruction from the user;
an updating unit for updating the second energy amount without updating the first energy amount based on an energy amount accumulated in the power source for driving or an energy amount released from the power source for driving in accordance with an instruction from the user, and updating the first energy amount without updating the second energy amount based on an energy amount accumulated in the power source for driving or an energy amount released from the power source for driving in the power transmission and reception performed in accordance with an instruction from an external control device of the vehicle, without an instruction from the user; and
a control unit for presenting information representing the second energy amount that has been updated by the updating unit to the user.

2. The capacity control device according to claim 1, wherein,
the power source for driving is a battery,
the storage unit is for storing information representing a first remaining capacity and a second remaining capacity of a remaining capacity of the battery, the first remaining capacity being available for power transmission and reception between the battery and the power grid without an instruction from the user of the vehicle, and the second remaining capacity being available to the user in response to an instruction from the user,
the updating unit is for updating the second remaining capacity without updating the first remaining capacity based on a charge amount or a discharge amount of the battery, which derives from charge or discharge of the battery performed in accordance with an instruction from the user, and for updating the first remaining capacity without updating the second remaining capacity based on a charge amount or a discharge amount of the battery in the power transmission and reception performed in accordance with an instruction from an external control device of the vehicle, without an instruction from the user, and
the control unit is for presenting information representing the second remaining capacity that has been updated by the updating unit to the user.

3. The capacity control device according to claim 2, wherein the control unit is for presenting information representing a charging rate to the user, which is obtained based on a maximum capacity and the second remaining capacity of a capacity of the battery, the maximum capacity being available to the user of the vehicle.

4. The capacity control device according to claim 3, further comprising a capacity change obtaining unit for obtaining an instruction to change the maximum capacity, wherein,
the control unit is for presenting information representing a new charging rate to the user, which is obtained based on the maximum capacity that has been changed, and the second remaining capacity.

5. The capacity control device according to claim 4, wherein the control unit is for prohibiting, when the second remaining capacity is lower than a predetermined value, power transmission and reception from the battery to the power grid during a charge of the battery even if the first remaining capacity is higher than a predetermined value.

6. The capacity control device according to claim 5, further comprising:
a shift instruction obtaining unit for obtaining an instruction to shift from one of the first remaining capacity and the second remaining capacity to the other, wherein
the updating unit is for updating, when the instruction to shift is obtained, the first remaining capacity and the second remaining capacity based on a capacity to be shifted from one of the first remaining capacity and the second remaining capacity to the other.

7. The capacity control device according to claim 3, wherein the control unit is for prohibiting, when the second remaining capacity is lower than a predetermined value, power transmission and reception from the battery to the power grid during a charge of the battery even if the first remaining capacity is higher than a predetermined value.

8. The capacity control device according to claim 7, further comprising:
a shift instruction obtaining unit for obtaining an instruction to shift from one of the first remaining capacity and the second remaining capacity to the other, wherein
the updating unit is for updating, when the instruction to shift is obtained, the first remaining capacity and the second remaining capacity based on a capacity to be shifted from one of the first remaining capacity and the second remaining capacity to the other.

9. The capacity control device according to claim 3, further comprising:
a shift instruction obtaining unit for obtaining an instruction to shift from one of the first remaining capacity and the second remaining capacity to the other, wherein
the updating unit is for updating, when the instruction to shift is obtained, the first remaining capacity and the second remaining capacity based on a capacity to be shifted from one of the first remaining capacity and the second remaining capacity to the other.

10. The capacity control device according to claim 9, wherein the shift instruction obtaining unit is for obtaining an instruction to shift from the first remaining capacity to the second remaining capacity from the user.

11. The capacity control device according to claim 4, further comprising:

a shift instruction obtaining unit for obtaining an instruction to shift from one of the first remaining capacity and the second remaining capacity to the other, wherein
the updating unit is for updating, when the instruction to shift is obtained, the first remaining capacity and the second remaining capacity based on a capacity to be shifted from one of the first remaining capacity and the second remaining capacity to the other.

12. The capacity control device according to claim 2, further comprising:
a shift instruction obtaining unit for obtaining an instruction to shift from one of the first remaining capacity and the second remaining capacity to the other, wherein
the updating unit is for updating, when the instruction to shift is obtained, the first remaining capacity and the second remaining capacity based on a capacity to be shifted from one of the first remaining capacity and the second remaining capacity to the other.

13. The capacity control device according to claim 12, wherein the shift instruction obtaining unit is for obtaining an instruction to shift from the first remaining capacity to the second remaining capacity from the user.

14. The capacity control device according to claim 13, wherein the shift instruction obtaining unit is for permitting acceptance of an instruction to shift from the first remaining capacity to the second remaining capacity from the user when a power demand in the power grid is lower than a predetermined value.

15. The capacity control device according to claim 12, wherein the shift instruction obtaining unit is for obtaining an instruction to shift from the second remaining capacity to the first remaining capacity from the user.

16. The capacity control device according to claim 15, wherein the shift instruction obtaining unit is for permitting acceptance of an instruction to shift from the second remaining capacity to the first remaining capacity from the user when a power demand in the power grid is higher than a predetermined value.

17. The capacity control device according to claim 12, further comprising:

a value control unit for determining a cost of shifting a capacity from one of the first remaining capacity and the second remaining capacity to the other based on a power demand in the power grid, wherein
the control unit is for presenting a cost determined by the value control unit to the user.

18. The capacity control device according to claim 2, wherein the control unit is for prohibiting, when the second remaining capacity is lower than a predetermined value, power transmission and reception between the battery and the power grid during a charge of the battery even if the first remaining capacity is higher than a predetermined value.

19. The capacity control device according to claim 18, further comprising:
a shift instruction obtaining unit for obtaining an instruction to shift from one of the first remaining capacity and the second remaining capacity to the other, wherein
the updating unit is for updating, when the instruction to shift is obtained, the first remaining capacity and the second remaining capacity based on a capacity to be shifted from one of the first remaining capacity and the second remaining capacity to the other.

20. A non-transitory computer-readable medium having stored thereon a program for causing a computer to perform operations comprising:
storing information representing a correspondence of a first user to a plurality of second users;
storing information representing a correspondence of the plurality of second users to a plurality of vehicles equipped with a power source for driving;
obtaining schedule information representing an estimated period in which at least a part of the plurality of vehicles becomes available for power transmission and reception with a power grid from the first user; and
associating cost information representing a cost that should be provided to the first user with the first user when at least a part of the plurality of vehicles is available for power transmission and reception with the power grid in the estimated period.

* * * * *